(12) United States Patent
White (10) Patent No.: US 8,269,368 B2
(45) Date of Patent: Sep. 18, 2012

(54) WIND AND SOLAR ELECTRIC GENERATOR

(76) Inventor: Alan Ashley Alexander White, Phoenix, AZ (US)

( * ) Notice: Subject to any disclaimer, the term of this patent is extended or adjusted under 35 U.S.C. 154(b) by 409 days.

(21) Appl. No.: 12/708,383

(22) Filed: Feb. 18, 2010

(65) Prior Publication Data

US 2011/0198855 A1 Aug. 18, 2011

(51) Int. Cl.
*F03D 9/00* (2006.01)
(52) U.S. Cl. .......................... 290/55; 290/44
(58) Field of Classification Search ............ 290/44
See application file for complete search history.

(56) References Cited

U.S. PATENT DOCUMENTS

| | | | | |
|---|---|---|---|---|
| 7,045,702 B2* | 5/2006 | Kashyap | ............... | 136/244 |
| 7,804,185 B1* | 9/2010 | Dravis | ............... | 290/44 |
| 7,834,477 B2* | 11/2010 | Sheikhrezai | ............... | 290/55 |
| 2003/0178855 A1* | 9/2003 | Li | ............... | 290/43 |

FOREIGN PATENT DOCUMENTS

| | | | |
|---|---|---|---|
| JP | 2011058389 A | * | 3/2011 |
| WO | WO 2009125031 A1 | * | 10/2009 |

* cited by examiner

*Primary Examiner* — Joseph Waks
(74) *Attorney, Agent, or Firm* — Schmeiser, Olsen & Watts LLP (57) ABSTRACT

A generator for generating electricity from wind and solar resources consisting of a double bell shaped member containing a first turbine associated with at least one first magnet, a drive shaft coupled to said first turbine, at least one blade coupled to said drive shaft and associated with at least one second magnet; at least one solar device operably coupled to said at least one second magnet; at least one second turbine coupled to said drive shaft and associated with at least one third magnet; a diffuser within said double bell shaped member. A control system for controlling said generator consisting of a controller; a cogged base coupled to said generator and operably coupled to said controller; and a sensor operably coupled to said controller. A generator for generating electricity from wind and solar resources which may be coupled to private residences may comprise a tail fin instead of a cogged base.

7 Claims, 8 Drawing Sheets

WIND AND SOLAR ELECTRIC GENERATOR

BACKGROUND OF THE INVENTION

1. Technical Field

This invention relates to a generator that produces electricity using both wind and solar resources.

2. Background Art

Currently the world is undergoing an energy transformation. Fossil fuels are declining in easy accessibility, thus it is more important than ever that innovative, distributive and personal electric energy sources are developed.

Wind power, as a resource, is not being effectively utilized for electric power production in the United States. Current windmill technology uses giant towers, up to 400 ft tall, with blades that can be 180 ft in length, thereby requiring enormous amounts of space in order to operate. Windmills also operate in a limited range of wind speeds; as an example, a current 1.5 MW windmill has a cut-in wind speed of 3.5 m/s (7.8 mph) and a cut-out wind speed of 20-25 m/s (44.7-55.9 mph) with a roughly 28% performance ratio. Winds above or below the cut-in and cut-out wind speeds are not utilized by the windmills, thus no power production. All current windmill designs have these limitations to one degree or another.

Current windmills also produce a harmonic vibration that travels some distance due to the heights of the towers and frequency of the sound. Spinning blades produce a "whoosh" noise that travels horizontally through the surrounding air. Fluid dynamics and tonal harmonics allows for this sound to travel many miles. This noise has been associated with all sorts of local legislation that now limits the available locations for windmills Around the world, many units have needed to be removed due to complaints from neighbors about the "noise" that they make even though they were originally installed under existing permit codes.

Solar power has its place, but for large scale power production it has vast limitations, such as, enormous amounts of space and a high cost with limited return. Residential or other minimum production units offer very limited investment return on what is still a high relative cost factor. Solar alone at our current technology level will never produce the amount of output to justify its initial and ongoing costs.

Accordingly, what is needed is a generator that produces electricity using both wind and solar resources and which can operate in limited space and at any wind speed, thus producing significantly more total electric output production with little residual noise. These generators need to produce electric power for commercial distribution and singular, personal applications.

DISCLOSURE OF THE INVENTION

The invention, as disclosed hereafter in this application, is a true turbine electric generator, with a variable dimension characteristic, that will provide significant increases in production capacity for any application operated by wind torque and solar.

The present invention also is relatively quiet compared to current windmill technology. The invention produces a swirling turbine vortex that travels out and down toward the ground thus limiting the travel of the sound. The diffuser at the exit of the generator also breaks up the harmonics thus limiting their travel and resonance. The sound emitted will not be the "whoosh", but more of a diminishing swirl. The true noise emitted will be established once a prototype is built and tested. If necessary, advanced noise cancellation technology will be incorporated in the design to make this invention sound neutral, thus allowing for installation in any location whether industrial, commercial, residential, urban or rural.

Further, the present invention allows versatility of generator sizes for power production in even extreme climates and harsh applicational environments. Fixed force air generators will also give unlimited range to non-carbon vehicles.

The present invention may be readily adapted to a variety of generators that produce electricity using both wind and solar resources. Embodiments of the present invention may provide, among other benefits: generators that can operate in confined space, in limited space, on roof tops and on much lower towers in commercial applications than current windmills, and utilize wind at virtually any speed.

In particular embodiments, a device for generating electricity comprises a member comprising a first end and a second end; a first turbine within said first end of said member; a first device for removing energy from said first turbine; a drive shaft coupled to said first turbine; an accelerator comprising: at least one blade coupled to said drive shaft; at least one solar device associated with said at least one blade; at least one second turbine within said second end of said member and coupled to said drive shaft; and a second device for removing energy from said second turbine.

Alternate embodiments of the present invention may comprise a member comprising a first end and a second end; a first turbine within said first end of said member; at least one first magnet associated with said first turbine; a drive shaft coupled to said first turbine; an accelerator coupled to said drive shaft; at least one second turbine within said second end of said member and coupled to said drive shaft; and at least one second magnet associated with said second turbine.

Other embodiments of the present invention may comprise a double bell shaped member comprising a first end having a larger circumference, a middle having a smaller circumference and a second end having a larger circumference; a first turbine within said first end of said member; a first device for removing energy from said first turbine; a drive shaft coupled to said first turbine; an accelerator coupled to said drive shaft; at least one second turbine within said second end of said member and coupled to said drive shaft; and a second device for removing energy from said second turbine.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

As discussed above, embodiments of the present invention relate to a wind and solar electric generator. In particular, a wind and solar electric generator configured according to the present invention effectively uses both wind and solar resources and operates in limited space and at virtually any wind speed. Generally, a wind and solar electric generator configured according to embodiments of the present invention comprises a double bell shaped member, a first generator, an accelerator, a secondary generator, a sensor, a controller and a cogged base.

Figure 1:
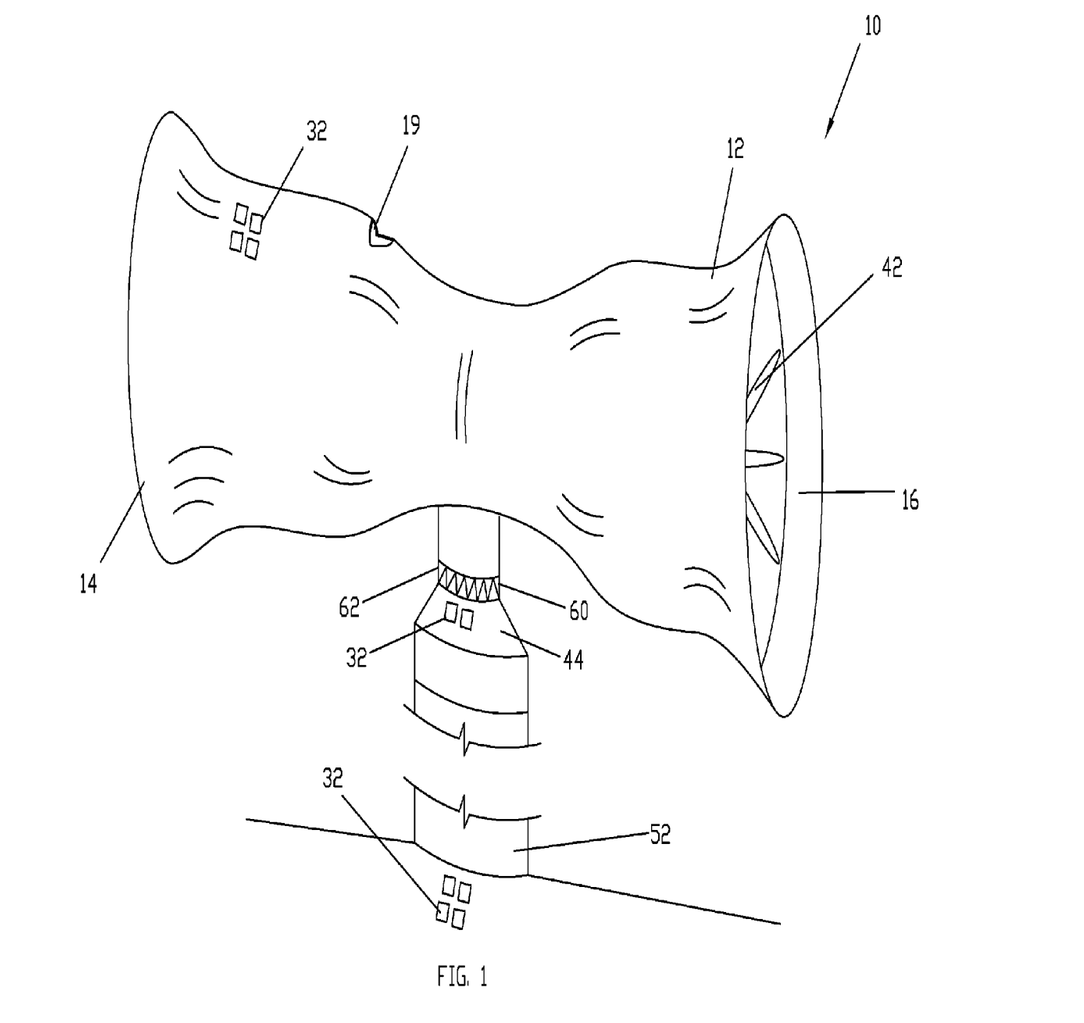
FIG. 1 is a perspective view of a wind and solar electric generator configured according to an embodiment of the present invention.

FIG. 1 illustrates an isometric view of a wind and solar electric generator 10 configured according to an embodiment of the present invention. A wind and solar electric generator 10 comprises a double bell shaped member 12. The double bell shaped member 12 is a hollow member which has a first end 14 and a second end 16. The double bell shaped member 12 is shaped so that both the first end 14 and the second end 16 are shaped like a bell. In other words, the double bell shaped member 12 has a larger circumference at first end 14 and a larger circumference at second end 16 than toward the midpoint. The circumference of the double bell shaped member 12 narrows towards the midpoint between first end 14 and second end 16. This shape aids in the flow of the air through the generator 10. However, the double bell shaped member 12 may have any shape that allows the generator 10 to function. In order for the generator 10 to function, the shape should have larger circumferences at the two ends and narrow towards the middle. Alternate examples would be a double cone shape or the like. The double bell shaped member 12 may be formed of any material desirable. The hatching on the double bell shaped member 12 in FIG. 2, though indicating metal, is not meant to be limiting on the type of material that may be used to form the double bell shaped member 12. The double bell shaped member 12 also comprises at least one small opening 19 to relieve the pressure of the air flowing through the double bell shaped member 12.

Figure 2:
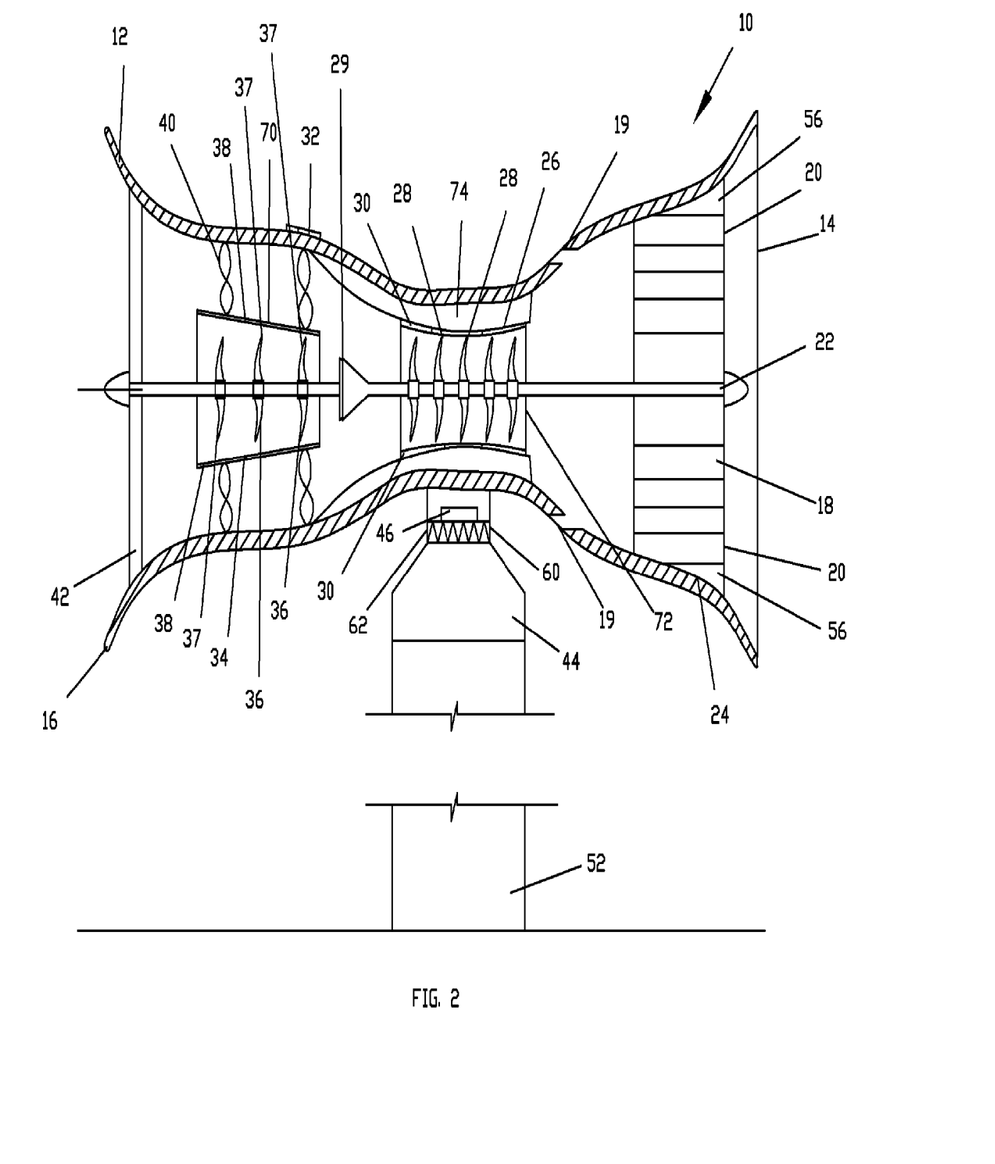
FIG. 2 is a cross sectional view of a wind and solar electric generator configured according to an embodiment of the present invention taken along line a-a of FIG. 3.

The double bell shaped member 12 is mounted on a cogged base 44 which is coupled to a motor 46 (see FIG. 2). The motor 46 may be positioned within the cogged base 44. The cogged base 44 rotates the double bell shaped member 12 when the motor 46 is started. The cogged base 44 and motor 46 allow the double bell shaped member 12 to be rotated so that the generator 10 is facing into a wind at a given location in order to maximize utilization of the wind for generation of electricity.

The cogged base 44 is a cylindrical pillar that is coupled to the double bell shaped member 12. In alternate embodiments, the cogged base 44 may be any shape desired. The cogged base 44 starts, where it is coupled to the double bell shaped member 12, at a smaller circumference and than at a certain point begins to expand to a much larger circumference. Right before the cogged base 44 begins to expand, is an area containing cogs 60. These cogs 60 are round plates with gear teeth 62 extending upward from the plates. Two of these cogs 60 are placed with the gear teeth 62 intermeshing. The motor 46 is coupled to the cogs 60 and rotates one of the cogs 60 with respect to the other cog 60. This rotates the top of the cogged base 44 which is coupled to the double bell shaped member 12.

The cogged base 44 is further mounted on a tower 52. The tower 52 is a cylindrical concrete pillar. The tower 52 may be 50 to 100 feet tall which is significantly shorter than prior art towers. The tower 52 is mounted to the ground and is the support for the entire generator 10. The generator 10 may also be mounted on the towers of current windmills through use of an adapter. The tower of a current windmill may also be shortened and then the generator 10 may be mounted on the tower.

Figure 3:
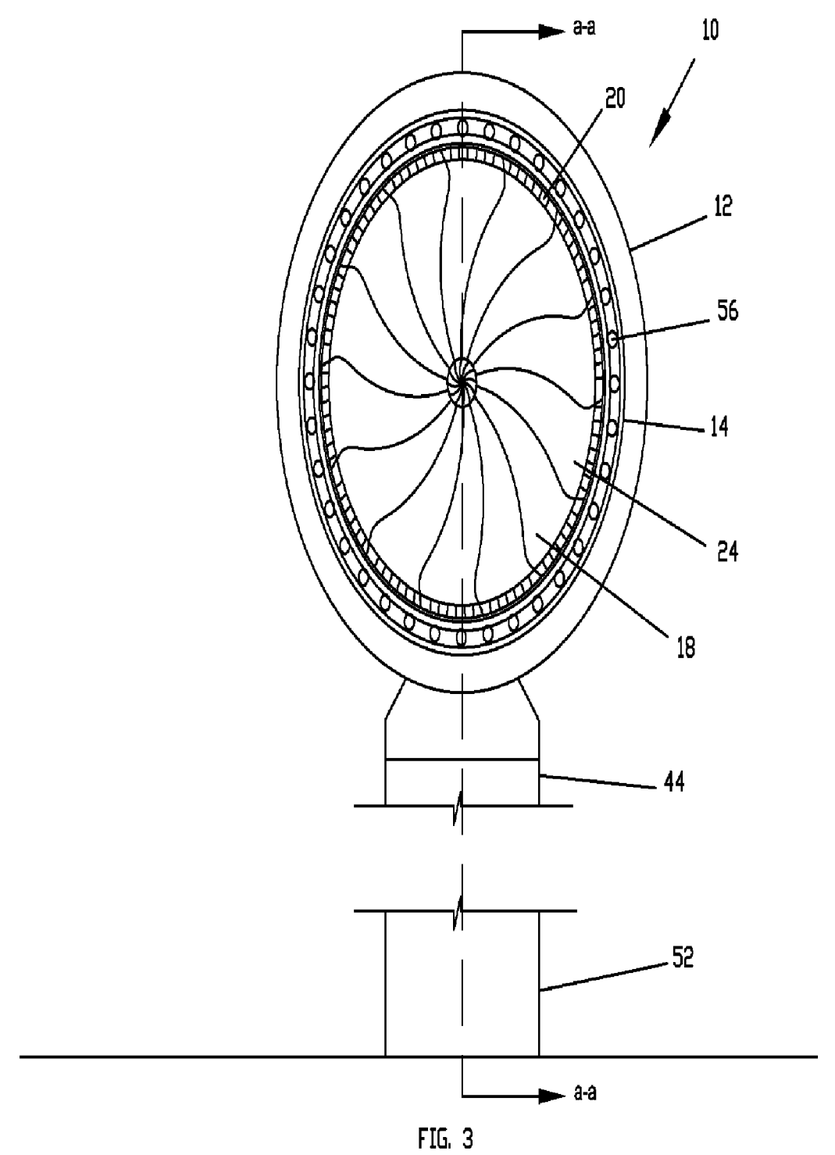
FIG. 3 is a front view of a wind and solar electric generator configured according to an embodiment of the present invention.

FIG. 2 illustrates a cross section of the generator 10 of FIG. 3. The cross section is taken along line a-a of FIG. 3. When the generator 10 is in operation, wind enters the double bell shaped member 12 at its first end 14. The wind first enters the first generator 24 which is located within the first end 14 of the double bell shaped member 12. The first generator 24 consists of a first turbine 18. The first turbine 18 is a modified form of a turbine used in a standard turbine engine. The first turbine 18 is a large turbine that almost fills the circumference of the first end 14 of the double bell shaped member 12. A front view of the generator 10 is illustrated in FIG. 3. In this figure, the front of the first turbine 18 can be seen.

Figure 5:
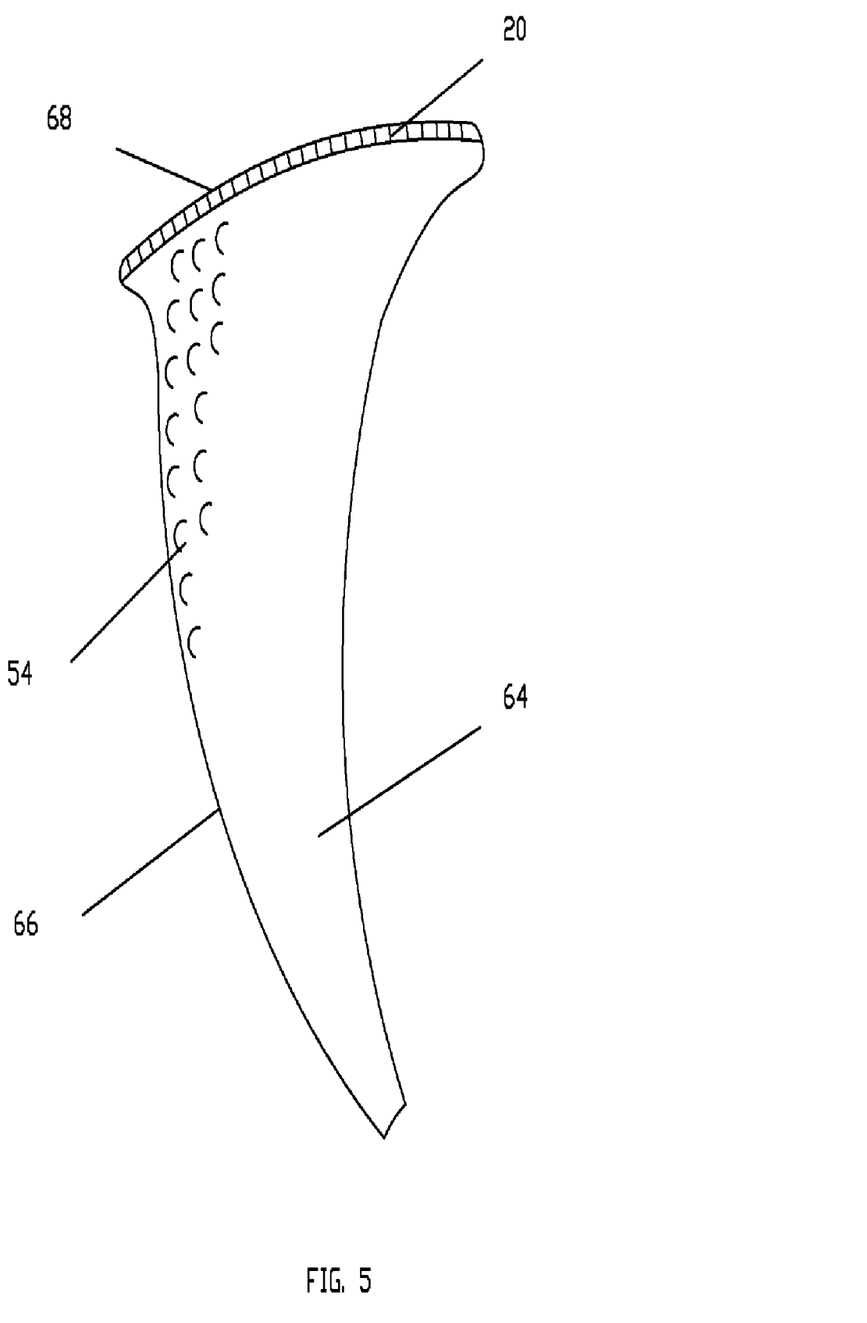
FIG. 5 is a front view of a turbine blade from a wind and solar electric generator configured according to an embodiment of the present invention.

FIG. 5 illustrates a front view of a turbine blade 64. Turbine blades 64 like this would be used to create the first turbine 18. The turbine blade 64 may be formed in any shape that provides the desired results; however, a turbine blade 64 with a mushroom-like end such as illustrated in FIG. 5 may be desirable. As can be seen in FIG. 5, a leading edge 66 of the turbine blade 64 is covered in small raised areas 54. These small raised areas 54 help the turbine blade 64 to "grab" more air and thereby increases efficiency of the generator 10. A blade edge 68 of the turbine blade 64 has at least one first magnet 20 coupled to it.

Referring again to FIG. 2, the first turbine 18 is coupled to a drive shaft 22 which runs down the center, or longitudinal axis, of the generator 10. The drive shaft 22, in preferred embodiments, is an inline variable drive shaft. An inline variable drive shaft allows one end of the drive shaft to rotate at a different speed than the other end of the drive shaft. This is accomplished through section 29 of the drive shaft 22, which may comprise any means of rotating the two sections of the drive shaft 22 at different speeds. One embodiment may comprise a conical coupling as illustrated at section 29. The drive shaft 22 may be any shape desired; however, a preferred embodiment utilizes a cylindrical drive shaft 22.

The at least one first magnet 20 coupled to the blade edge 68 of the turbine blade 64 serves to interact with at least one first generator coil 56 (See FIG. 2) coupled to the circumference of the double bell shaped member 12 surrounding the first turbine 18. The at least one first magnet 20 interacts with the at least one first generator coil 56 as the first turbine 18 spins in the wind and create electricity. The at least one first generator coil 56 may surround the entire circumference of the double bell shaped member 12 or they may be placed in strategic locations around the circumference. The at least one first magnet 20 may be any type or shape of magnet that will serve the purpose described above, however, in preferred embodiments, rare earth magnets may be used.

The at least one first generator coil 56 operates to remove or transfer the energy in the rotating first turbine 18 into electricity. The at least one first generator coil 56 may be replaced with any device that serves this purpose. In alternate embodiments, the at least one first generator coil 56 may be coupled to the blades of the first turbine 18 and the at least one first magnet 20 may be coupled to the inside circumference of the double bell shaped member 12.

Once the wind passes through the first generator 24, it enters the accelerator 26. The accelerator 26 acts to compress and accelerate the air funneling through it. Therefore, the accelerator 26 is placed within the narrowest part of the double bell shaped member 12. The accelerator 26 is located within the accelerator chamber 72 which acts to narrow the narrowest part of the double bell shaped member 12 even further. No air is allowed to pass around the accelerator chamber 72; instead the air is forced into the small accelerator chamber 72. The accelerator chamber 72 may be any shaped desired, however, the accelerator chamber 72 must be large enough to contain the accelerator 26 and small enough to allow the air passing through the accelerator 26 to be compressed and accelerated to the needed pressure and speed. As illustrated in FIG. 2, the accelerator chamber 72 may be a hollow cylindrical shape.

The accelerator 26 comprises at least one blade 28, but, typically, there will be a plurality of blades 28, at least one second magnet 30, and at least one solar device 32. The blades 28 are coupled to the drive shaft 22 and are placed in series so that the air must pass through multiple blades 28. The blades 28 may be any shape desired that serves the purpose of spinning in the wind passing through the accelerator 26. The blades 28 may also have a metal edge or be formed from metal.

The metal edge of the blades 28 interacts with at least one second magnet 30. The at least one second magnet 30 is an electro-magnet which causes the blades 28 to rotate. In order to cause the blades 28 to rotate, the magnetic field of the electro-magnet is alternated. The alternating field attracts or repels the blades 28 causing them to rotate. The at least one second magnet 30 is coupled to the circumference of the accelerator chamber 72 surrounding the blades 28. The at least one second magnet 30 may surround the entire circumference of the accelerator chamber 72 or the at least one second magnet 30 may be strategically positioned at different locations around the circumference.

The at least one second magnet 30 is operably coupled to at least one solar device 32. The at least one solar device 32 is placed on the outer circumference of the double bell shaped member 12, on the outer circumference of the cogged base 44, on the outer circumference of the tower 52 or on the ground, in a position where the at least one solar device 32 will receive optimum exposure to the sun. The at least one solar device 32 may be nano solar devices, solar panels, thin film, printable nano solar devices and any other device that converts sunlight to electricity. This electricity is transferred to the at least one second magnet 30 which is an electromagnet. The at least one second magnet 30 causes the blades 28 to spin, thereby accelerating and compressing the air. The spinning blades 28, also, cause the drive shaft 22 to spin and thereby accelerates the first turbine 18.

Figure 8:
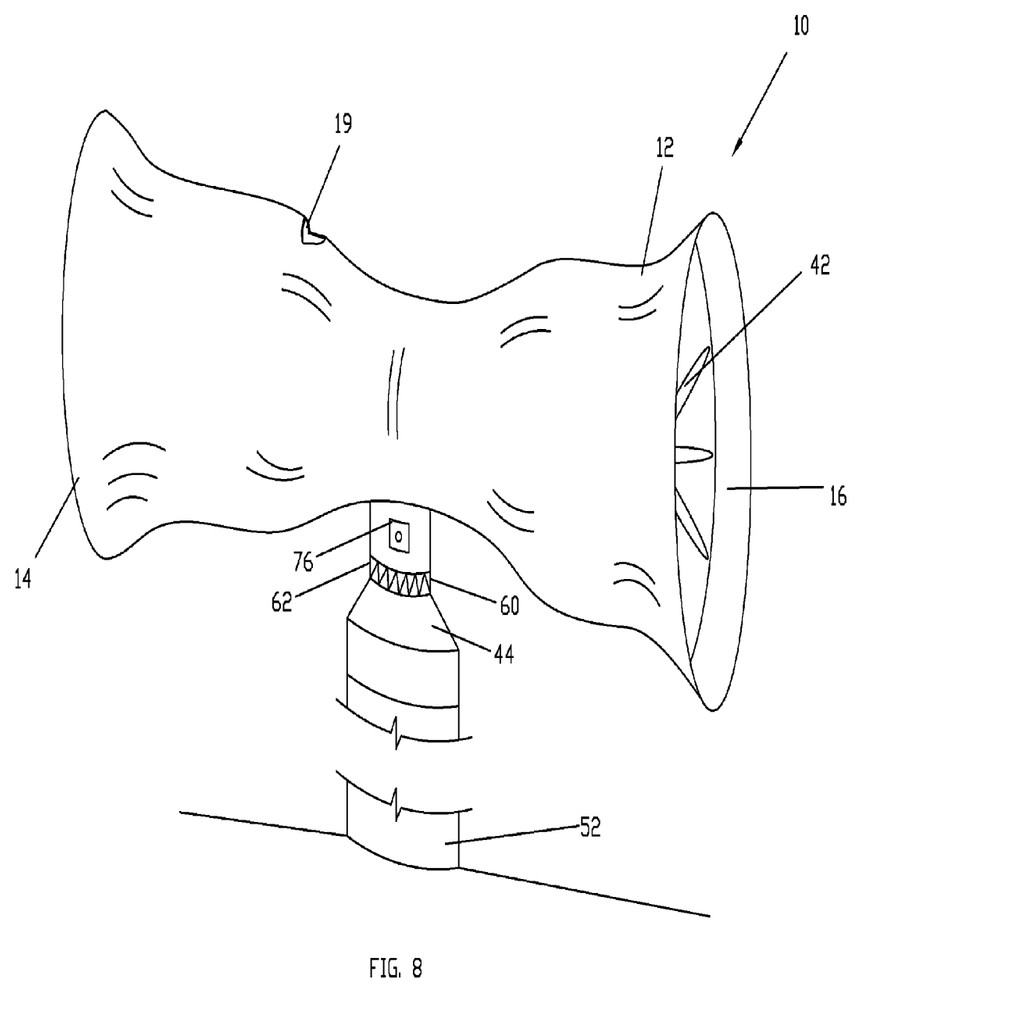
FIG. 8 is a perspective view of a wind and solar electric generator configured according to a third embodiment of the present invention.

The at least one solar device 32 may also be a solar device at a remote location or one which is already in existence. This remote solar device 32 is coupled to the generator 10 through a coupling 76 such as the one shown in FIG. 8.

In alternate embodiments, a dry storage battery may be used to power the accelerator 26. A dry storage battery would be particularly useful in commercial applications.

Once the wind passes through the accelerator 26, it enters the secondary generator 34. The secondary generator 34 is configured similarly to the first generator 24, except on a smaller scale. The secondary generator 34 is located within a secondary generator wall 70. The secondary generator wall 70 is a hollow chamber contained within the second end 16 of the double bell shaped member 12.

The secondary generator wall 70 is held in position within the second end 16 of the double bell shaped member 12 by spiral foil brackets 40. The spiral foil brackets 40 are brackets shaped in the form of figure 8's. The spiral foil brackets 40 support the secondary generator wall 70, while also allowing wind to travel past them without significant interference.

Within the secondary generator wall 70 is at least one second turbine 36. The at least one second turbine 36 further comprises an at least one third magnet 37. The at least one second turbine 36 is coupled to the drive shaft 22 and interacts with at least one second generator coil 38. The at least one second generator coil 38 is coupled to the circumference of the secondary generator wall 70 around the at least one second turbine 36. The at least one second generator coil 38 may surround the entire circumference of the secondary generator wall 70 or else it may simply be placed in strategic locations around the circumference.

As the wind passes through the at least one second turbine 36, the turbine 36 spins and the at least one third magnet 37 interacts with the at least one second generator coil 38 which produces electricity that can be used for other purposes.

The at least one second generator coil 38 operates to remove or transfer the energy in the rotating second turbine 36 into electricity. The at least one second generator coil 38 may be replaced with any device that serves this purpose. In alternate embodiments, the at least one second generator coil 38 may be coupled to the blades of the second turbine 36 and the at least one third magnet 37 may be coupled to the inside circumference of the double bell shaped member 12.

The turbine blades of the at least one second turbine 36 may be configured as a single blade or a series of blades as is shown in FIG. 2. An edge of a blade of the at least one second turbine 36 may comprise the at least one third magnet 37 which would be positioned similarly to the at least one first magnet 20 as seen in FIG. 5. Unlike, the blade shown in FIG. 5, however, the blades of the at least one second turbine 36 are smooth and do not have the small raised areas 54 of blade 64. The blades of the at least one second turbine 36 may also have any shape which spins in the air traveling through the double bell shaped member 12.

The at least one third magnet 37 coupled to the blade edge of the turbine blade of the at least one second turbine 36 serve to interact with the at least one second generator coil 38 coupled to the circumference of the secondary generator wall 70 surrounding the at least one second turbine 36. The at least one second generator coil 38 interacts with the at least one third magnet 37 as the at least one second turbine 36 spins in the wind and create electricity. The at least one second generator coil 38 may surround the entire circumference of the secondary generator wall 70 or they may be placed in strategic locations around the circumference. The at least one third magnet 37 may be any type or shape of magnet that will serve the purpose described above, however, in preferred embodiments, rare earth magnets may be used. Other advanced magnetic technology may also be utilized.

Figure 4:
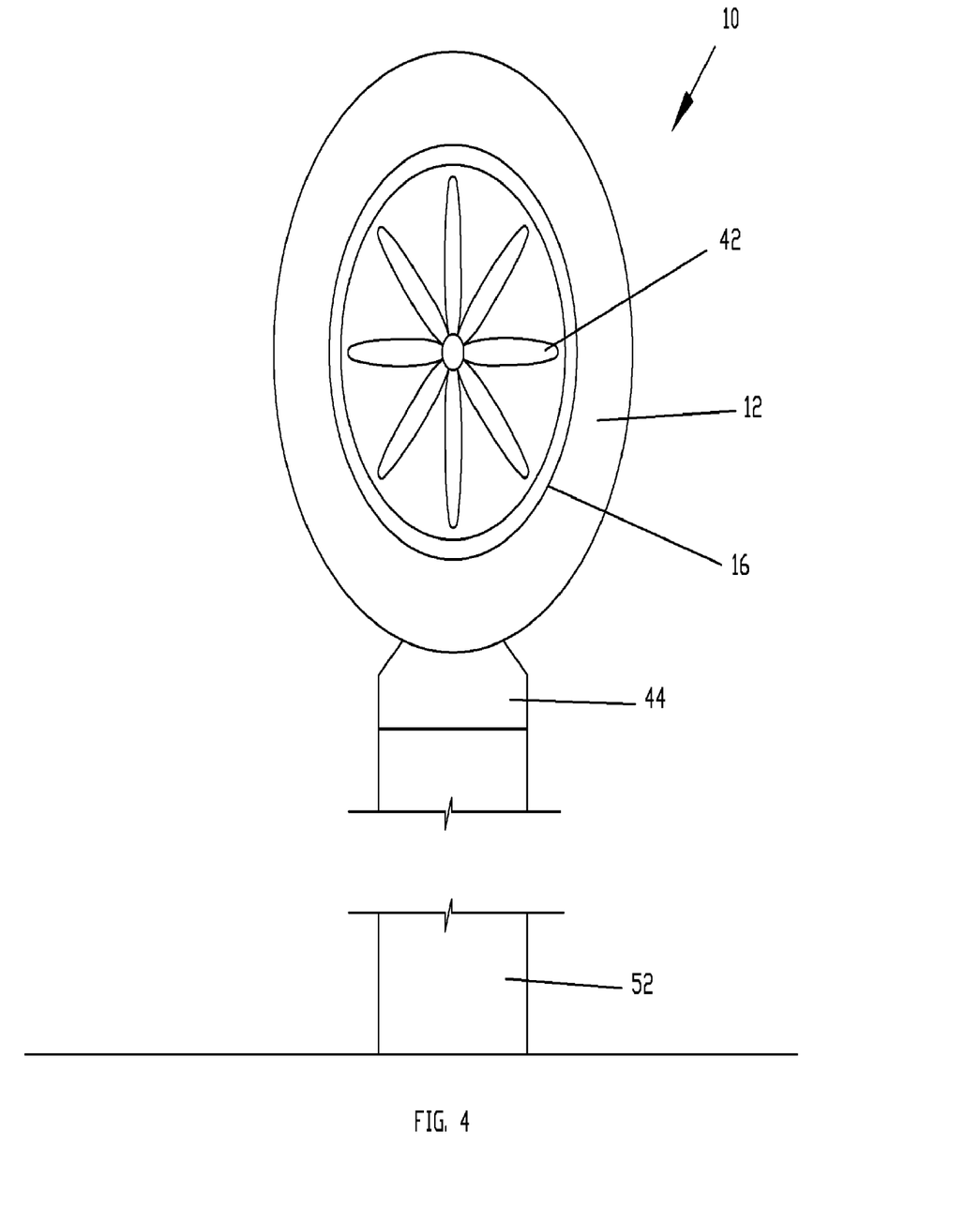
FIG. 4 is a rear view of a wind and solar electric generator configured according to an embodiment of the present invention.

Once the wind passes through the secondary generator 34, it continues through the double bell shaped member 12 and passes through a diffuser 42. FIG. 4 illustrates a rear view of the generator 10. The rear view of the generator 10 shows the diffuser 42 which is positioned in the second end 16 of the double bell shaped member 12. The diffuser 42 is simply a free spinning blade that reintegrates the air exiting the generator 10 into the surrounding environment. The diffuser 42 may be any shape desired so long as it serves the purpose of the diffuser 42. The diffuser 42 may also be almost the size of the circumference of the second end 16 of the double bell shaped member 12 as illustrated in FIG. 4.

Figure 6:
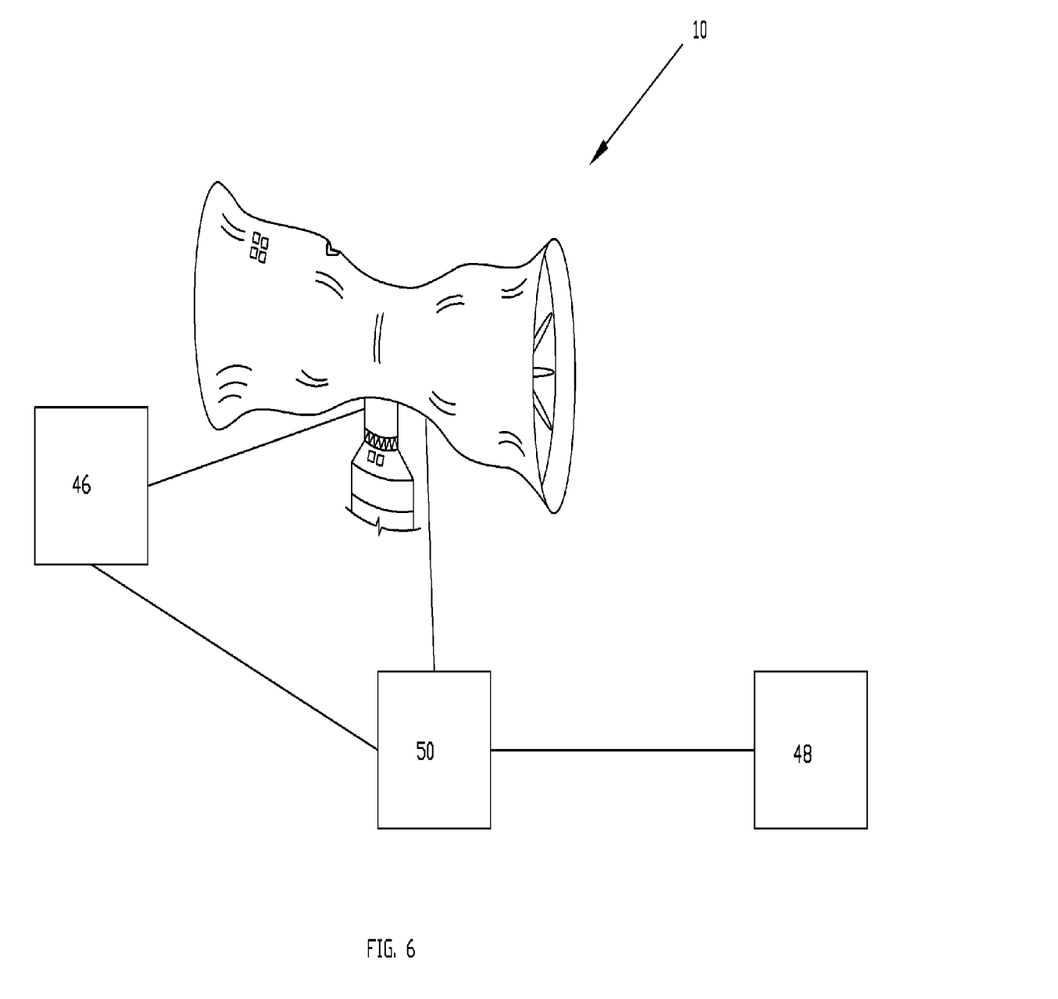
FIG. 6 is a diagram of a wind and solar electric generator configured according to an embodiment of the present invention.

As illustrated in FIG. 6, at least one sensor 48 is located some distance from the generator 10. The at least one sensor 48 measures the wind speed and direction at the at least one sensor's 48 location. The at least one sensor 48 then transfers this information to a controller 50. The at least one sensor 48 is operably coupled to a controller 50 via wires or the like.

The controller 50 is a device that takes the information provided by the at least one sensor 48 and uses it to determine the configuration of the generator 10. For example, the controller 50 determines the direction the generator 10 faces and the speed at which that the accelerator 26 spins. The controller 50 may be any device that serves this purpose including a personal computer or the like. The controller 50 may be located in the control area 74 between the accelerator chamber 72 and the double bell shaped member 12 or within the tower 52.

The controller 50 takes the information about wind direction provided by the at least one sensor 48 and determines the direction the generator 10 should be facing. Then the controller 50 controls the motor 46 coupled to the cogged base 44. The controller 50 operates the motor 46 until the cogged base 44 is rotated so that the generator 10 is facing the direction that optimizes use of the wind.

The controller 50 also takes information about the wind speed provided by the at least one sensor 48 and determines the optimal speed of the first turbine 18 in order to optimize use of the wind. The controller 50 then balances for potential cavitation and uses the accelerator 26 to speed up or slow down the first turbine 18. Thus, the speed of the first turbine 18 is then optimized for any gusts of wind.

In operation, wind enters the generator 10 at the first end 14 of the double bell shaped member 12 (see FIG. 1). The wind rotates the first turbine 18 which interacts with the at least one first generator coil 56 thereby producing electricity. The wind then travels to the accelerator 26 which compresses and accelerates the air through the use of electricity received from solar devices 32 positioned on the outside of the double bell shaped member 12. Then the wind travels through the secondary generator 34 producing electricity through the same method as used in the first generator 24. The wind then travels through the diffuser 42 and reenters the environment.

If the wind changes direction or speed, the controller 50 (see FIG. 6) compensates in order to maximize use of wind resources.

Figure 7:
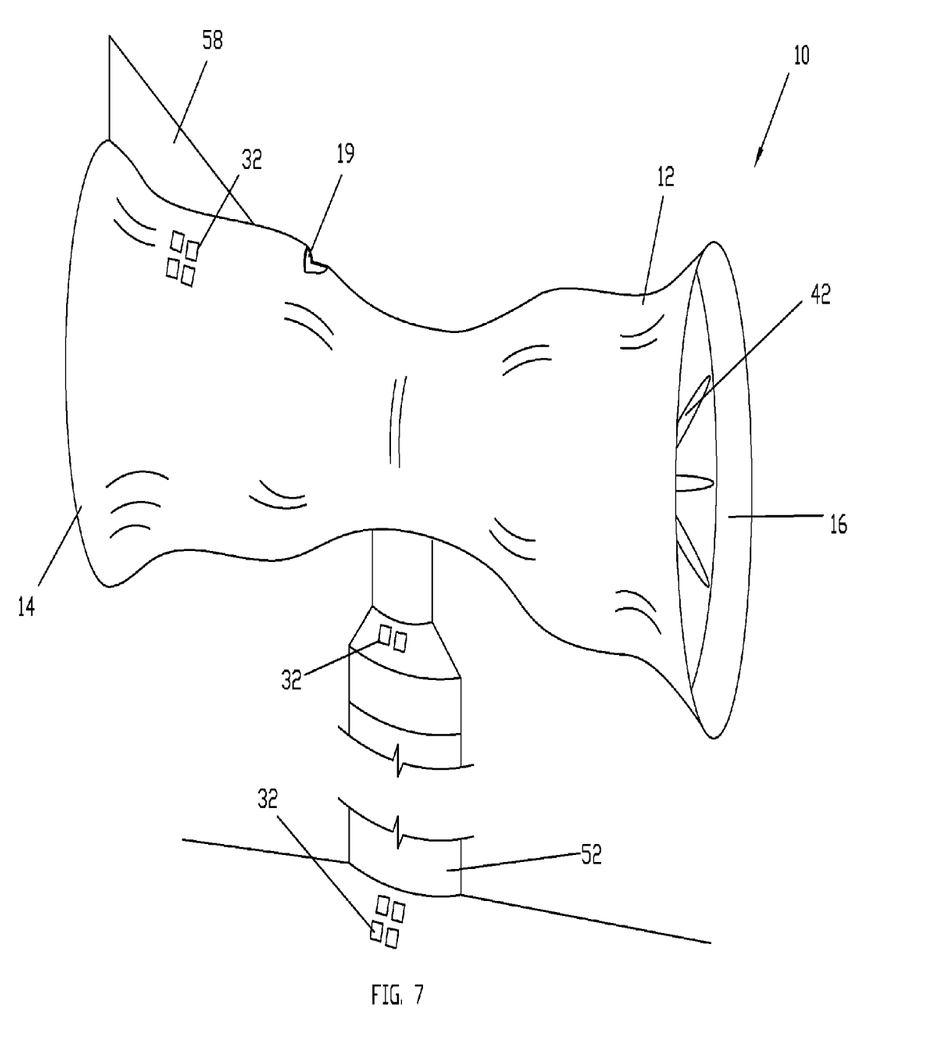
FIG. 7 is a perspective view of a wind and solar electric generator configured according to a second embodiment of the present invention.

In alternate embodiments of the present invention, smaller wind and solar generators may be created for use on homes, retail locations, land vehicles, marine vehicles and the like. These smaller generators, as seen in FIG. 7, may not comprise a cogged base. Instead they comprise a swiveling base 59 which allows the double bell shaped member 12 to freely rotate. The direction of the generator 10 is then controlled by a tail fin 58 which acts in the same manner as a weather vane and rotates the generator 10 as the wind changes direction. This configuration lowers manufacturing costs for the smaller units. It also may eliminate any harmonic caused by the rotation of the cogged base. On forced air units, such as those used on vehicles that are moving, the generator 10 can be positioned to face the direction of travel and may also be positioned so that it does not rotate at all.

In current windmill technology, cooling is a serious concern. Cooling in a generator 10 configured according to embodiments of the present invention occurs due to air flowing through and around the generator 10. In particular, air flowing around the outside of the secondary generator wall 70 keeps the secondary generator 34 cool.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A device for generating electricity comprising:
    a member comprising a first end and a second end;
    a first turbine within said first end of said member;
    a first device for removing energy from said first turbine;
    a drive shaft coupled to said first turbine;
    a compressor comprising:
    at least one blade coupled to said drive shaft;
    at least one solar device associated with said compressor and generating electric power to drive said compressor;
    at least one second turbine within said second end of said member and coupled to said drive shaft; and
    a second device for removing energy from said second turbine.

2. The device of claim 1, wherein said first device for removing energy comprises at least one magnet.

3. The device of claim 1, wherein said second device for removing energy comprises at least one magnet.

4. The device of claim 1, wherein said first turbine further comprises a raised leading edge.

5. The device of claim 1, wherein said first turbine further comprises blade edge magnets.

6. The device of claim 1, further comprising a control system comprising:
    a controller; a cogged base coupled to said member and operably coupled to said controller; and at least one sensor operably coupled to said controller.

7. The device of claim 6, wherein said at least one sensor determines the direction wind is blowing at the at least one sensor location.

* * * * *